(12) United States Patent
Spelter et al.

(10) Patent No.: US 10,479,702 B2
(45) Date of Patent: Nov. 19, 2019

(54) CLEANING MODULE, FILTER ELEMENT AND FILTER SYSTEM

(71) Applicant: MANN+HUMMEL GMBH, Ludwigsburg (DE)

(72) Inventors: Lars Spelter, Ditzingen (DE); Idriss Razgani, Ludwigsburg (DE); Christoph Baumann, Moeglingen (DE)

(73) Assignee: MANN+HUMMEL GmbH, Ludwigsburg (DE)

(*) Notice: Subject to any disclaimer, the term of this patent is extended or adjusted under 35 U.S.C. 154(b) by 0 days.

(21) Appl. No.: 15/443,007

(22) Filed: Feb. 27, 2017

(65) Prior Publication Data

US 2017/0247263 A1    Aug. 31, 2017

(30) Foreign Application Priority Data

Feb. 25, 2016  (DE) .................. 10 2016 002 264

(51) Int. Cl.

| | | |
|---|---|---|
| *C02F 1/28* | (2006.01) |
| *B01D 35/00* | (2006.01) |
| *B01D 17/02* | (2006.01) |
| *B01D 17/00* | (2006.01) |
| *F02M 35/02* | (2006.01) |
| *F02M 35/024* | (2006.01) |
| *F02M 35/09* | (2006.01) |
| *C02F 101/32* | (2006.01) |
| *F02M 37/24* | (2019.01) |

(52) U.S. Cl.
CPC .......... *C02F 1/283* (2013.01); *B01D 17/0202* (2013.01); *B01D 17/08* (2013.01); *B01D 35/005* (2013.01); *C02F 1/285* (2013.01); *F02M 35/024* (2013.01); *F02M 35/0218* (2013.01); *F02M 35/09* (2013.01); *F02M 37/24* (2019.01); *C02F 2101/32* (2013.01); *F02M 35/02441* (2013.01)

(58) Field of Classification Search
CPC ...... B01D 53/02; B01D 53/06; B01D 53/047; B01D 36/001; B01D 39/2055
See application file for complete search history.

(56) References Cited

U.S. PATENT DOCUMENTS

| | | | | |
|---|---|---|---|---|
| 8,245,498 B2* | 8/2012 | Liu | ............ | F01M 13/04 |
| | | | | 60/283 |
| 9,861,916 B2* | 1/2018 | Lin | ............ | B01D 35/16 |
| 9,963,337 B2* | 5/2018 | Liccioni | ............ | B67D 1/0801 |

FOREIGN PATENT DOCUMENTS

| | | | |
|---|---|---|---|
| DE | 102004036070 A1 | 2/2006 | |
| DE | 102014211236 A1 | 12/2015 | |
| DE | 102015006766 A1 | 12/2015 | |
| WO | WO-2015173949 A1 * | 11/2015 | ............ B01D 53/04 |

* cited by examiner

Primary Examiner — Ana M Fortuna
(74) Attorney, Agent, or Firm — James Hasselbeck

(57) ABSTRACT

A cleaning module (10) for cleaning a media flow of a first medium contaminated with a second medium that has a housing (12) having an inlet (18) and an outlet (20, 21) and a replaceable filter element (30) arranged within the housing (12). In this arrangement, a flow direction (32) of the media flow is directed through the filter element (30) in the specified installed state against the force of gravity. The filter element (30) has an absorptive and/or adsorptive material (34) for picking up at least a portion of the second medium in the first medium. A filter element for the cleaning module (10) and a filter system (100) having the cleaning module (10) are disclosed.

16 Claims, 4 Drawing Sheets

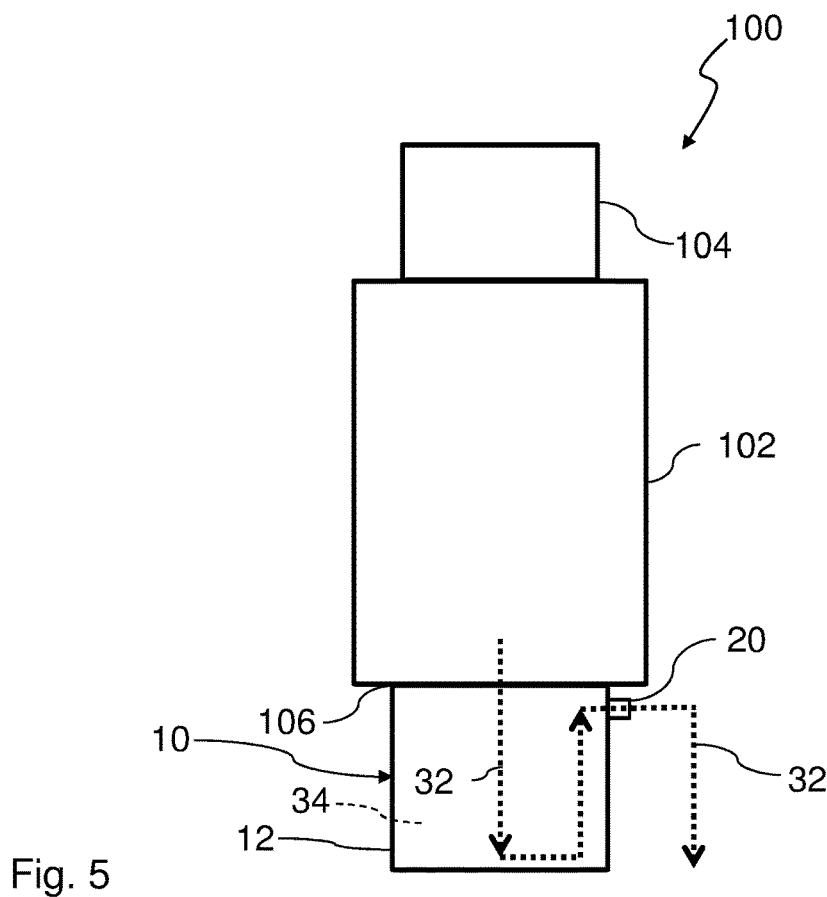
Fig. 5
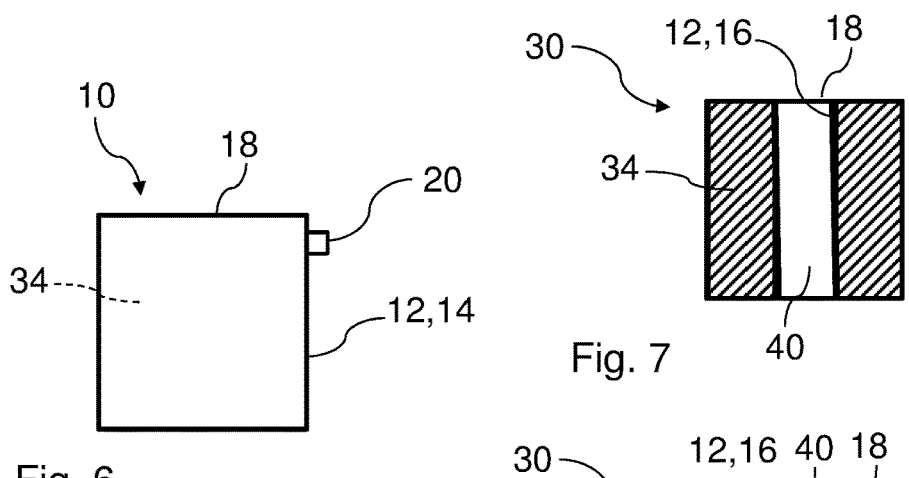
Fig. 6
Fig. 7
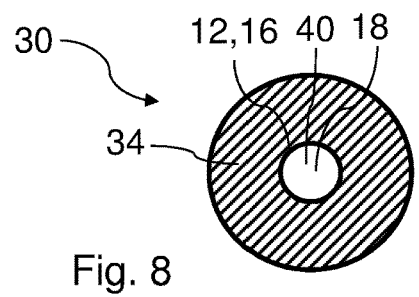
Fig. 8

CLEANING MODULE, FILTER ELEMENT AND FILTER SYSTEM

TECHNICAL FIELD

The invention relates to a cleaning module for cleaning a media flow of a first medium contaminated with a second medium and a filter element for a cleaning module and a filter system, in particular in a fuel supply system, in particular in a diesel fuel supply system of a motor vehicle.

BACKGROUND

Water may accumulate, for example by condensation, in the fuel system of an internal combustion engine, in particular of a motor vehicle. Separation of the water portion in the fuel is required for reliable engine operation. Known fuel systems have a water separator for this purpose in which a water portion is separated from the fuel via a coalescer or a hydrophobic filter medium.

The separation of the water portion using known devices results in the separated water not being pure, but instead containing fuel components. The disposal of the amount of separated water contaminated with a portion of fuel is especially problematic with respect to the required environmental protection.

A water separator of a fuel system for an internal combustion engine in which an adsorption filter for adsorptive pickup of a fuel portion in the separated water is arranged downstream of its water outlet is known from DE 10 2004 036 070 A1.

SUMMARY

A filter element of the adsorption filter effects an adsorption of the fuel portion via a retention behavior, wherein the fuel portion of the supplied separated water quantity attaches to the filter material and is held there. The amount of water routed through the adsorption filter has a high degree of purity downstream of the filter. The adsorption material of the filter element is, for example, activated charcoal or a swellable, absorptive plastic, such as polypropylene, polyethylene or PVC. The adsorption material is designed as a loose, granulated filler material, as a sintered body or as a foam for the formation of the filter element.

One object of the invention is to create a cleaning module of a filter system for cleaning a media flow of a first medium contaminated with a second medium that is designed to be maintenance-friendly.

A further object of the invention is to create a filter element for a cleaning module and a filter system having a cleaning module that is maintenance friendly.

The aforementioned objectives are achieved according to one aspect of the invention in the case of a cleaning module as well as in the case of a filter system by virtue of the cleaning module comprising a housing with an inlet and an outlet and a replaceable filter element arranged in the housing, wherein the filter element has an absorptive and/or adsorptive material for picking up at least a portion of the second medium in the first medium.

Advantageous designs of the invention are shown in the description and the drawings.

A cleaning module for cleaning a media flow of a first medium contaminated with a second medium is proposed that comprises a housing having an inlet and an outlet and a replaceable filter element arranged within the housing. In this arrangement, a flow direction of the media flow is directed through the filter element in the specified installed state against the force of gravity. The filter element has an absorptive and/or adsorptive material for picking up at least a portion of the second medium in the first medium.

The cleaning module may be advantageously used in a fuel supply system of a motor vehicle in which separated-out water represents the first medium, which is contaminated with the fuel as the second medium.

The water accumulates if fuel, preferably diesel fuel, is cleaned by a diesel-water separator and in the course of this the water is separated out. The water is typically captured in a collection chamber, which may be arranged directly in the filter housing. The water may also be captured in a separate container or a transparent bowl. The water is then drained from the filter system. If the water is to be drained into the environment, it is purified of remaining hydrocarbons before contact with the environment. Activated charcoal is typically used for this purpose.

If activated charcoal is to be used for cleaning the water originating from fuel supply systems of motor vehicles or stationary motors, the service life of the adsorptive activated charcoal depends on the amount of water and the concentration of hydrocarbons in it. The greater the portion of hydrocarbons or the greater the amount of water, the sooner the adsorbent is depleted and must be replaced. The hydrocarbons, in particular diesel, may in part be dissolved in water or also be present as an emulsion. The solubility observed in the field varies between 3 and 6 mg of hydrocarbons according to DIN EN ISO 9377-2 H 53. However, a diesel-in-water emulsion is present if, for example, the finest diesel drops are dispersed in the water. These emulsions are usually very stable, so that they do not separate into two phases in the time available up until the draining of the water. The concentration of hydrocarbons may between 500 mg/l and 2000 mg/l or more water for these emulsions according to DIN EN ISO 9377-2 H 53. If activated charcoal is to be used then for the adsorption, it is impossible for every vehicle in every region worldwide to predict how much water is to accumulate and with what concentration of hydrocarbons. The differences are regionally (various markets with different fuel qualities) and locally (various operators of gasoline stations) too great for a uniform service life in the form of, for example, a lifetime component to be achievable with a fixed quantity of activated charcoal. The required amount of activated charcoal would not be practicable because the installation space is very limited in modern vehicles. For a lifetime component, several liters of activated charcoal might be necessary if the fuel contains a relatively large amount of water and it is assumed that a diesel-in-water emulsion is nearly exclusively present. The latter may be viewed as a given on the basis of many years of experience with diesel water separators in the industry.

According to the solution according to the invention, the activated charcoal is arranged in the filter element of a cleaning module, for example in the form of a cartridge, which may preferably be removed from the housing and replaced without tools via, for example, a quick-release closure. The shape of the cartridge is optimized for the optimal utilization of the volume.

Due to the design as a service part instead of a replacement part, it is easier for the operator to replace the activated charcoal. Furthermore, the amount of activated charcoal may be substantially reduced compared to the design as a lifetime component. This saves on installation space. Furthermore, the change interval may be flexibly adapted on the basis of regional and local differences regarding the accumulation of separated water. The loading of the activated charcoal with hydrocarbons may be monitored via the detection of the draining operations in the vehicle. If a corresponding number of water draining operations is exceeded, a message may, for example, be placed in the error memory of the vehicle. On the occasion of the next regular service, the activated charcoal cartridge may then be changed. A corresponding reserve is to be factored in for this purpose. If the operator of the engine uses water-free fuel, the activated charcoal is not loaded and does not have to be replaced. The operator therefore incurs no additional costs compared to a lifetime component.

A ratio of length to diameter of the filter element for the cleaning module may be, for example, between 1:1 and 15:1; preferably, the ratio may be between 2:1 and 6:1. In this way, a favorable flow through the absorptive and/or adsorptive material and an advantageous utilization of the capacity of the absorptive and/or adsorptive material may be achieved.

Advantageously, the outlet may be arranged in the specified installed state above the inlet or the admission into the absorbent and/or adsorbent or the separator of the filter element. The water may thus advantageously flow upward through the filter medium in the form of the absorptive and/or adsorptive material from below, wherein the pressure of the water may be just enough to be able to drain back out of the cleaning module through the outlet in the top area of the filter element. The water may therefore flow through the absorptive and/or adsorptive material, for example activated charcoal, and in this way advantageously be cleaned.

According to an advantageous design, the housing may comprise a first housing part and a second housing part, wherein the first and the second housing part are in particular designed to form a detachable, media-tight joint with each other. As a result, the filter element may be arranged in the interior of the housing and, after detachment of the two housing parts from each other, be removed from the interior in order to be replaced or else reconditioned. As a result of the two housing parts being joined media tight, it is ensured that the medium to be cleaned may flow in through the inlet and drain off only at the outlet.

According to an advantageous embodiment, the filter element may be arranged on the first or the second housing part, in particular detachably arranged. The filter element may thus be joined to one of the two housing parts in order to be removed hanging on the housing part from the other of the two housing parts in order to be, for example, replaced or reconditioned after loading with the second medium. This ensures that the filter element may be favorably handled by it being removable with the housing part from the other housing part without it being necessary to grasp the filter element itself. The seal between the two housing parts may be designed as a simple seal because the media flow proceeds at low pressure within the cleaning module. The filter element may be non-detachably joined to the first or second housing part. However, it is also conceivable in particular for the filter element to be detachably joined.

According to an advantageous design, the inlet may be arranged on the first housing part and the outlet on the second housing part. For example, the first housing part may represent the lower housing part. Thus, the inlet is arranged on the lower housing part. The second housing part may be placed on or screwed onto the first housing part from above. If the outlet is arranged on the second housing part in this way, the medium to be cleaned may flow upward through the cleaning module from below and drain through the outlet on the upper housing part. As a result, the flow may proceed upward from below through the filter element, which is arranged in the interior of the two housing parts and may be cleaned. Also, the filter element may favorably be removed upward for replacement so that as little leakage of the first medium as possible occurs.

According to an advantageous design, the inlet and the outlet may be arranged on the first housing part. In this way, both inlet and outlet may be arranged on the first housing part, which may represent the lower of the two housing parts in the cleaning module. Thus, it is possible that inlet and outlet remain permanently connected to connection components and for the removal of the filter element only the second housing part as the upper housing part needs to be removed in order to replace or condition the filter element. In this way, the maintenance of the cleaning module is made much easier.

According to an advantageous embodiment, the adsorptive material may be provided as a loose, granulated filler material. A loose filler material made up of individual grains in granulate form is especially advantageous in order for a medium to be cleaned to flow through it. Thus, the loose, granulated filler material offers an embodiment that is especially easy to flow through in order to advantageously absorb and/or adsorb the medium to be picked up. Thus, a very effective cleaning of the second medium from the first medium is possible. Moreover, this also ensures that the pickup capacity of the absorptive and/or adsorptive material is exhausted as favorably as possible, which advantageously enables a long service life of the filter element.

According to one advantageous embodiment, the absorptive and/or adsorptive material may be provided in sintered and/or foamed form. In alternative embodiments of the absorptive and/or adsorptive material, it may also be designed as a sintered body or a foamed filter element. Also as a result of this, it is possible that the absorptive and/or adsorptive material offers as large a surface as possible to the medium to be cleaned so that the inner surface, in the case of activated charcoal, is accessible to a large extent, so as to connect effective cleaning to as great a pickup capacity as possible for the filter element, whereupon the service life of the filter element is extended. This produces a high absorption or adsorption performance with little flow-through resistance.

According to an advantageous embodiment, the absorptive and/or adsorptive material may have activated charcoal. Activated charcoal has proven itself to be a very suitable material, for example, for cleaning fuel, such as diesel fuel, out of water by adsorption of the fuel. The grain size of the activated charcoal may preferably be, on average, around 0.5 mm. The mass of the activated charcoal in the filter element may be, for example, 50 grams to 400 grams, preferably 100 grams to 200 grams.

According to an advantageous embodiment, the absorptive and/or adsorptive material may have a swellable plastic, in particular PE, PP or PVC, wherein a mixture of the aforementioned materials is also possible. Likewise, other materials having similar, comparable properties may alternatively or additionally be used.

According to an advantageous embodiment, the absorptive and/or adsorptive material may have a filler material made of plastic tubules, in particular a filler material made of plastic tubules together with a nonwoven fabric. Also, such a filler material made of plastic tubules, in particular together with a nonwoven fabric, offers a large surface in order to clean, for example, water contaminated with fuel as effectively as possible and, moreover, to achieve a long service life of the filter element by favorable utilization of the pickup capacity of the absorptive and/or adsorptive material. Compared to activated charcoal, the pickup capacity relative to the volume of the material is lower because the inner surface of the activated charcoal is superior to the other materials.

According to an advantageous embodiment, an indicator for displaying the loading of the filter element with the second medium is provided. Such an indicator makes it possible to utilize the pickup capacity of the absorptive and/or adsorptive material as effectively as possible in order to thereby actually replace or condition the filter element only if the pickup capacity is really exhausted and the service life of the filter element is thereby utilized to the full extent. In this way it is possible to advantageously realize principles of need-based maintenance of a filter system.

According to one aspect of the invention, a filter element is proposed that comprises an absorptive and/or adsorptive material for picking up a portion of the second medium in the first medium, wherein the filter element for pickup is designed and provided in a cleaning module according to any of the preceding claims. The filter element may contain the absorptive and/or adsorptive material in an appropriate container through which the medium to be cleaned may favorably flow, for example, a porous sleeve or a nonwoven fabric, such an arrangement being especially advantageous for a filler material and/or adsorptive material. Alternatively, it is conceivable that the absorptive and/or adsorptive material is designed to be self-supporting as, for example, a sintered or pressed body, so that the absorptive and/or adsorptive material may be arranged directly on a housing part and be removable or insertable together with it.

According to an advantageous embodiment, the absorptive and/or adsorptive material may be provided as a loose, granulated filler material and/or be provided in sintered form and/or be provided as a foam.

According to an advantageous embodiment, the absorptive and/or adsorptive material may have activated charcoal and/or a swellable plastic, in particular PE, PP or PVC. Likewise, other materials having similar, comparable properties may alternatively or additionally be used.

According to a further aspect of the invention, a filter system for filtering a media flow containing a first and second medium is proposed. The filter system comprises a separation device for the first medium that is arranged in a filter system housing, and a cleaning module for the absorptive and/or adsorptive pickup of a portion of the second medium in a separated-out first medium. The cleaning module comprises a housing having an inlet and an outlet and a replaceable filter element arranged in the housing. In this arrangement, a flow direction of the media flow is directed through the filter element in the specified installed state against the force of gravity. The filter element has an absorptive and/or adsorptive material for picking up at least a portion of the second medium in the first medium. The filter system is provided for separation of the first medium, for example, water from the second medium, for example fuel, in particular diesel fuel. Because the separated out water may contain small amounts of fuel, the separated-out water may be cleaned before it can be discharged to the environment. This cleaning may be done effectively using the described cleaning module and under advantageous preconditions, such as compact design and better serviceability. This is because the cleaning module does not have to be designed for the lifetime of the filter system; because the filter element of the cleaning module may be replaced, it is possible to realize the cleaning module in as small an installation space as possible. As a result, such a filter system must be regarded as advantageous for both installation space technology reasons and from cost perspectives. The cleaning module may be arranged in a design next to the filter system housing or in a different design below the filter system housing.

According to an advantageous configuration, the cleaning module may be configured as a cartridge and be detachably connected via its first housing part and/or its second housing part to the filter system housing. The cleaning module may therefore be replaced as a cartridge with the loading with the second medium to be absorbed and/or adsorbed. In this way a fast and economical maintenance of the cleaning module is realized. If the cleaning module is detachably connected to the filter system housing, the transfer of the first medium to be cleaned from the filter system housing to the cleaning module may also be done in effective ways in a media-tight manner. Also in this way, as compact as possible a structure of the filter system with a cleaning module is embodied. The seal between the cleaning module and the filter system housing may be designed as a relatively simple seal because the media flow flows under pressure from the filter system to the cleaning module, wherein the pressure only has to just suffice so that the cleaned first medium drains back at the outlet of the cleaning module.

According to an advantageous embodiment, the cleaning module may be arranged in the filter system housing. This alternative arrangement of the cleaning module in the filter system housing enables an especially compact design of the overall filter system with integrated cleaning module, which enables solutions for the reconditioning of the separated first medium that are beneficial in terms of both installation space requirements and cost perspectives.

According to one advantageous configuration, the filter system may be designed as a fuel filter system and the cleaning module may be provided for the absorptive and/or adsorptive pickup of a fuel portion in separated-out water.

BRIEF DESCRIPTION OF THE DRAWINGS

Further advantages result from the following drawing description. Exemplary embodiments of the invention are depicted in the drawings. The drawings, the description and the claims contain numerous features in combination. A person skilled in the art will also expediently consider the features on an individual basis and combine them into other appropriate combinations.

Shown by way of example are:

FIG. 5 a schematic illustration of a filter system in a side view with a cleaning module according to a further exemplary embodiment of the invention in which the cleaning module is arranged on the bottom of the filter system housing;

FIG. 6 the removed cleaning module according to FIG. 5;

FIG. 7 the filter element of the cleaning module according to FIG. 6 in longitudinal section; and FIG. 8 the filter element of the cleaning module according to FIG. 6 in a top view.

DETAILED DESCRIPTION

Figure 1:
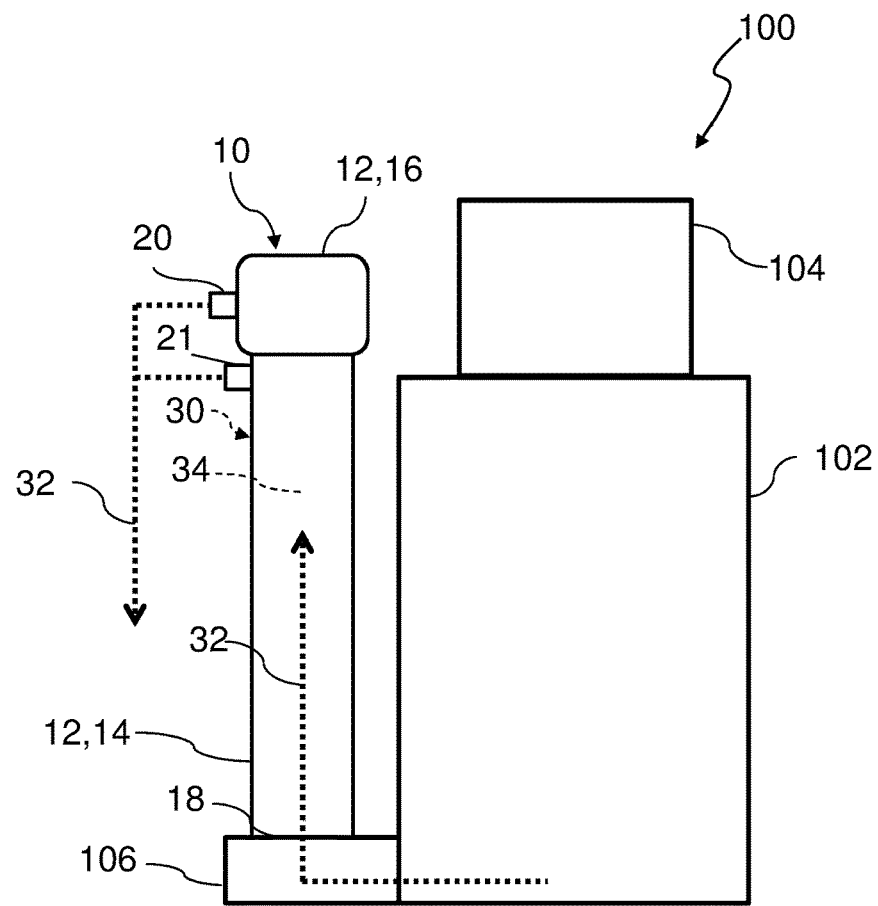
FIG. 1 a schematic illustration of a filter system in side view with a cleaning module according to an exemplary embodiment of the invention.

In the drawings, equal or equivalent components are assigned the same reference characters. The figures merely show examples and are to be understood as non-limiting.

The invention is described in reference to a cleaning module 10 for cleaning a media flow of a first medium contaminated with a second medium for a filter system 100, wherein the filter system 100 is, for example, a preferred fuel filter system, the first medium being water and the second medium being diesel fuel, wherein the water in the filter system 100 is separated out from the diesel fuel. However, other fields of application of the filter system 100 are also conceivable.

FIG. 1 shows a schematic representation of a filter system 100 in a side view with a cleaning module 10 according to an exemplary embodiment of the invention. The filter system 100 for filtering the media flow comprising the first medium and the second medium has a separation device (not shown) for the first medium arranged in the filter system housing 102. The filter system housing 102 has a preferably detachable, media-tight cover 104 in order to service or replace a filter element (also not shown) in the interior of the filter system housing 102. Furthermore, the filter system 100 has the cleaning module 10 for the absorptive and/or adsorptive pickup of a portion of the second medium in the separated-out first medium that is joined via connection part 106 to the filter system housing 102. The cleaning module 10 has a housing 12 with an inlet 18 and an outlet 20, wherein the inlet 18 is arranged on the first housing part 14, and the outlet 20 on the second housing part 16. The first and the second housing part 14, 16 are designed to form a media-tight joint, in particular a detachable one, with each other. To this end, the two housing parts 14, 16 may be joined, for example, by screws or by a quick-release closure. Alternatively, an outlet 21 is depicted that may be arranged on the first housing part 14. Such a solution is also favorable because then the second housing part 16, for example for removal of filter element 30, may be removed without releasing a joint of the outlet 21 to further components.

The replaceable filter element 30 is detachably arranged in the housing 12. The filter element 30 has an absorptive and/or adsorptive material 34 for pickup of at least a portion of the second medium in the first medium. The absorptive and/or adsorptive material 34 may preferably have activate charcoal. Alternatively, it is also conceivable that the absorptive and/or adsorptive material 34 has a swellable plastic, in particular PE, PP or PVC, which may also be designed as a filler material made of plastic tubules, in particular may be designed as a filler material made of plastic tubules together with a nonwoven fabric. The absorptive and/or adsorptive material 34 may be provided as loose, granulated filler material and/or provided in sintered form and/or provided as a foam.

The flow direction 32 of the media flow is from the filter system housing 102 through the connection part 106 through the inlet 18 into the housing 12 of the cleaning module 10, where the media flow is directed through the filter element 30 in the specified installed state against the force of gravity and exits the cleaning module 10 via the outlet 20 or in the alternative embodiment via the outlet 21 at the top.

In addition, an indicator for the display of a loading with the second medium may be arranged on the cleaning module 10 in order to thereby enable a need-oriented maintenance.

Figure 2:
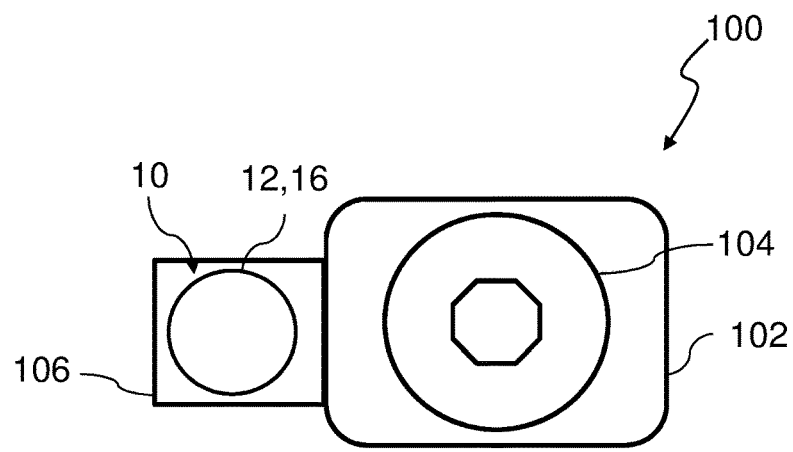
FIG. 2 the filter system with cleaning module from FIG. 1 in a top view.

In FIG. 2, the filter system 100 is depicted in a top view with cleaning module 10 from FIG. 1. The filter system housing 102 may be seen with cover 104 from above. The cleaning module 10 is arranged on the connection part 106 joined to the filter system housing 102. The second housing part 16 may be recognized on the connection part 106. The outlet 20 is omitted from the illustration.

Figure 3:
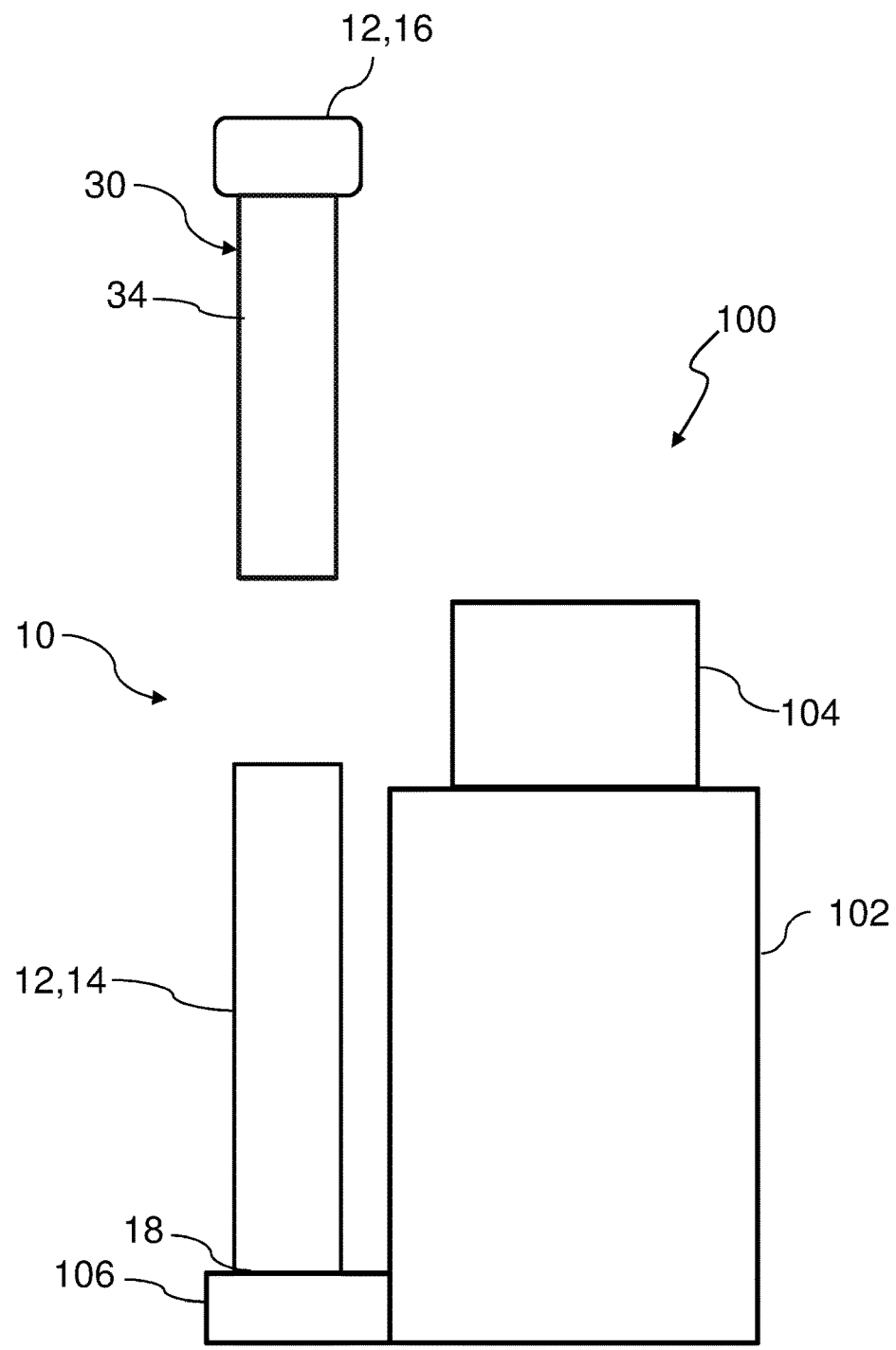
FIG. 3 the filter system with cleaning module from FIG. 1 with removed filter element on the cleaning module.

FIG. 3 shows the filter system 100 with cleaning module 10 from FIG. 1 with filter element 30 of the cleaning module 10 removed. The filter element 30 with the absorptive and/or adsorptive material 34 is arranged in this exemplary embodiment on the second housing part 16. The filter element 30 may be undetachably joined to the second housing part 16 and thus be treated as a unit. However, it is also conceivable that the filter element 30 is detachably arranged on the second housing part 16 and may be removed from it and replaced separately. Thus, the filter element 30 together with the second housing part 16 in the form of a cartridge may be removed from the first housing part 14 in the upward direction in order to be, for example, replaced or reconditioned. A new filter element 30 along with a second housing part 16 may be reused and connected—for example, screwed or clipped—to the first housing part 14 in a media-tight manner in order to shift the cleaning module 10 back into the operationally ready condition. The advantage of such an embodiment is that, when the filter element 30 together with the second housing part 16 is removed, the remaining first medium stays in the first housing part 14 and, thus, does not contaminate the environment.

Figure 4:
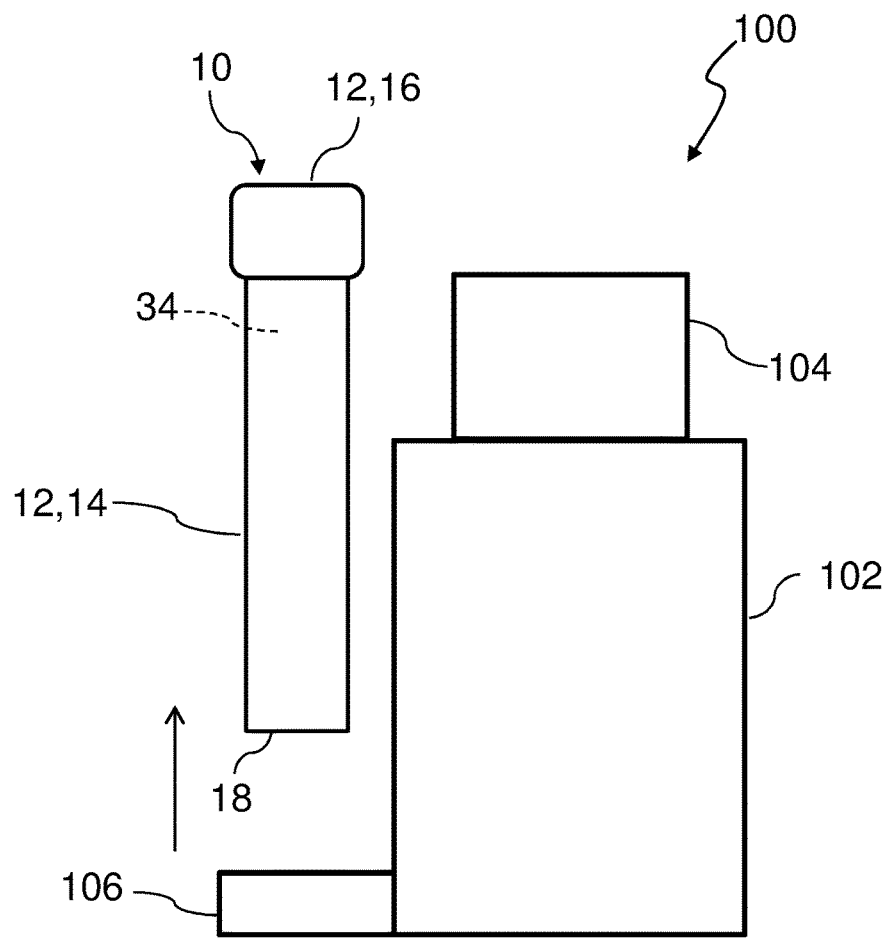
FIG. 4 a schematic illustration of a filter system with a cleaning module according to a further exemplary embodiment of the invention in which the entire cleaning module is designed to be removable.

FIG. 4 shows a schematic illustration of a filter system 100 with a cleaning module 10 according to a further exemplary embodiment of the invention in which the entire cleaning module 10 is designed to be removable. The cleaning module 10 is designed as a whole in this exemplary embodiment as a cartridge and is detachably joined via its first housing part 14 to the filter system housing 102. Therefore, the entire cleaning module 10 may be removed from the connection part 106 from above for maintenance purposes, and a new or reconditioned cleaning module 10 is placed back on the connection part 106 in order to shift the filter system 100 back into the operationally ready condition.

Alternatively, it is also conceivable that the cleaning module 10 is arranged directly in the filter system housing 102, so that it may be removed from the filter system housing 102 and be reused.

FIG. 5 shows a schematic illustration of a filter system 100 in a side view with a cleaning module 10 according to a further exemplary embodiment of the invention in which the cleaning module 10 is arranged on the bottom of the filter system housing 102; The cleaning module 10 is joined in a media-tight manner to the bottom of the filter system housing 102. The media flow is introduced from above through the middle of the cleaning module 10. The filter element 30 of this embodiment is depicted in FIG. 7 and is designed as a hollow cylinder made of absorptive and/or adsorptive material 34, so that the media flow in the central cavity 40 of the filter element 30 may flow downward and then may flow upward in the sleeve of the hollow cylinder through the absorptive and/or adsorptive material 34. For this purpose, the outer side of the cavity 40 expediently has a media-tight design, for example due to the second housing part 16, which is designed as a hollow cylinder and then lines the cavity 40 in order to conduct the media flow downward through the cavity 40, so that the media flow goes through the absorptive and/or adsorptive material 34 only in the sleeve of the hollow cylinder upward from below and does not go directly out of the cavity 40 into the absorptive and/or adsorptive material 34. The cleaned first medium, after flowing through the filter element 30, is then discharged to the outside via the outlet 20 arranged on the top edge of the cleaning module 10.

FIG. 6 shows the removed cleaning module 10 according to FIG. 5. The inlet 18 is arranged on the top side of the housing 12 of the cleaning module 10. The housing 12 itself may be designed, for example, with a cylindrical shape.

In FIG. 7, the filter element 30 of the cleaning module 10 according to FIG. 6 is depicted in a longitudinal section. The filter element 30 has a hollow cylindrical body made of absorptive and/or adsorptive material 34 with a central cavity 40. The cavity 40 together with its top opening represents the inlet 18 of the cleaning module 10. The second housing part 16 of the cleaning module housing may be designed, for example, as a hollow cylinder by means of which the cavity 40 may be sealed media-tight on its outer side in order to prevent the media flow from going directly into the absorptive and/or adsorptive material 34 of the filter element 30 when it enters the cleaning module 10 through the cavity 40. The media flow may thus flow out downward at the bottom of the second housing part 16 and in this way enter the absorptive and/or adsorptive material 34 of the filter element 30 from below in order to flow through the absorptive and/or adsorptive material 34 of the filter element 30 upward from below and thus ensure an effective cleaning of the first medium by absorption or adsorption of the portion of the second medium in the material 34.

FIG. 8 shows the filter element 30 of the cleaning module 10 according to FIG. 6 in a top view. The cavity 40 with the inlet 18 is represented as a central opening of the filter element 30.

What is claimed is:

1. A filter system for filtering a media flow comprising:
   a filter system housing having a connecting part projecting outwardly from the filter system housing;
   a first and second medium having a separating device for the first medium arranged in the filter system housing; and
   a cleaning module for cleaning a media flow of a first medium contaminated with a second medium for the absorptive and/or adsorptive pickup of a portion of the second medium in the separated-out first medium,
   wherein the cleaning module is a cartridge having a base portion which rests on and is detachably joined to the connecting part of the filter system housing, the cleaning module removable from the filter system housing for maintenance, the cleaning module including:
      a cleaning module housing having an inlet for the media arranged at the base portion; and
      an outlet for the media flow arranged at an upper portion of the cleaning module housing; and
      a replaceable filter element arranged within the cleaning module housing,
      wherein a flow direction of the media flow is directed through the filter element in the specified installed state against the force of gravity,
      wherein the filter element has an absorptive and/or adsorptive material configured for picking up at least a portion of the second medium in the first medium,
      wherein media flow enters the inlet at the base portion of the cleaning module from the connecting part of the filter system housing, the media flow flowing upwardly in the cleaning module against gravity to the outlet of the cleaning module, wherein media flow pressure in the cleaning module is limited by and only sufficient to raise the media flow against gravity from the inlet to the outlet of the cleaning module.

2. The filter system according to claim 1, wherein the housing comprises
   a first housing part; and
   a second housing part,
      wherein the first and the second housing parts form a detachable, media-tight sealed joint with each other.

3. The filter system according to claim 2, wherein the filter element is detachably mounted onto the first or second housing part.

4. The filter system according to claim 2, wherein the inlet is arranged on the cleaning module first housing part, and
the outlet on the cleaning module second housing part.

5. The filter system according to claim 2, wherein the inlet and the outlet are arranged on the cleaning module first housing part.

6. The filter system according to claim 1, wherein the absorptive and/or adsorptive material is provided as a loose, granulated fill material.

7. The filter system according to claim 1, wherein the absorptive and/or adsorptive material is provided in sintered and/or foamed form.

8. The filter system according to claim 1, wherein the absorptive and/or adsorptive material has activated charcoal.

9. The filter system according to claim 1, wherein the absorptive and/or adsorptive material has a swellable plastic comprising PE, PP or PVC.

10. The filter system according to claim 9, wherein the absorptive and/or adsorptive material comprises a fill material made of plastic tubules arranged together with a nonwoven fabric.

11. The filter system according to claim 1, wherein an indicator for displaying the loading of the filter element with the second medium is provided.

12. The filter system filter element according to claim 1, wherein
the absorptive and/or adsorptive material is provided as a loose, granulated fill material and/or is provided in sintered form and/or is provided as a foam.

13. The filter system filter element according to claim 1, wherein
the absorptive and/or adsorptive material has activated charcoal and/or has a swellable plastic comprising PE, PP or PVC.

14. The filter system cleaning module filter element according to claim 13, wherein
the absorptive and/or adsorptive material includes a fill material made of plastic tubules arranged together with a nonwoven fabric.

15. The filter system according to claim 1,
wherein the cleaning module is configured for the absorptive and/or adsorptive material cleans of a fuel portion in separated water.

16. A filter system for filtering a media flow comprising:
   a filter system housing;
   a first and second medium having a separating device for the first medium arranged in the filter system housing; and
   a cleaning module for cleaning a media flow of a first medium contaminated with a second medium for the absorptive and/or adsorptive pickup of a portion of the second medium in the separated-out first medium
   wherein the cleaning module is arranged on the bottom of the filter system housing and is joined to the filter system housing in a media tight manner;

wherein the cleaning module housing is cylindrical;

wherein the cleaning module has a replaceable filter element positioned within the cleaning module housing and the filter element is shaped as a hollow cylinder with a central cavity, and wherein the filter element made of absorptive and/or adsorptive material;

wherein the outer side of the filter element central cavity has a media tight seal, and wherein a top opening of the filter element central cavity represents the inlet of the cleaning module;

wherein the media tight seal prevents media flow from going directly into the absorptive and/or adsorptive material of the filter element when it enters the cleaning module through the filter element central cavity under the force of gravity and thus the media flow is downward to a bottom of the cleaning module housing and enters the filter element absorptive and/or adsorptive material from below in order to flow through the filter element absorptive and/or adsorptive material upward against the flow of gravity and the media is then discharged to the outside via an outlet arranged on the top edge of the cleaning module so that the media flow goes through the absorptive and/or adsorptive material only in a sleeve of the hollow cylinder upward from below and does not go directly out of the filter element central cavity into the absorptive an/or adsorptive material; and wherein media flow pressure in the cleaning module is limited by and only sufficient to raise the media flow against gravity from the bottom of the cleaning module housing to the outlet of the cleaning module.

\* \* \* \* \*